United States Patent
Feuilloley

(10) Patent No.: US 9,079,676 B2
(45) Date of Patent: Jul. 14, 2015

(54) DEVICE FOR INJECTING A PRESSURIZED LIQUID IN ORDER TO SHAPE A CONTAINER, COMPRISING A WORK CHAMBER ARRANGED DOWNSTREAM FROM PUMPING MEANS

(75) Inventor: Guy Feuilloley, Octeville sur Mer (FR)

(73) Assignee: Discma AG, Hunenberg (CH)

( * ) Notice: Subject to any disclaimer, the term of this patent is extended or adjusted under 35 U.S.C. 154(b) by 0 days.

(21) Appl. No.: 14/234,561

(22) PCT Filed: Jul. 19, 2012

(86) PCT No.: PCT/EP2012/064183
§ 371 (c)(1),
(2), (4) Date: Jan. 23, 2014

(87) PCT Pub. No.: WO2013/014062
PCT Pub. Date: Jan. 31, 2013

(65) Prior Publication Data
US 2014/0157723 A1     Jun. 12, 2014

(30) Foreign Application Priority Data

Jul. 25, 2011 (FR) .................................... 11 56732

(51) Int. Cl.
*B29C 49/46* (2006.01)
*B65B 1/04* (2006.01)
(Continued)

(52) U.S. Cl.
CPC . *B65B 1/04* (2013.01); *B29C 49/46* (2013.01); *B65B 3/022* (2013.01); *B29C 49/06* (2013.01); *B29C 2049/4664* (2013.01)

(58) Field of Classification Search
CPC ............... B29C 2049/4664; B29C 2049/4658; B29C 2049/4652; B29C 2049/4655; B29C 2049/465; B29C 49/46

USPC .................................................. 425/524, 535
See application file for complete search history.

(56) References Cited

U.S. PATENT DOCUMENTS

| 3,251,915 A | 5/1966 | Heinz |
| 4,935,190 A * | 6/1990 | Tennerstedt .................. 264/529 |

(Continued)

FOREIGN PATENT DOCUMENTS

| DE | 10 2004 014653 A1 | 10/2005 |
| EP | 2143544 A1 | 1/2010 |

(Continued)

OTHER PUBLICATIONS

Partial machine translation of JP 11179793A dated Jul. 1999, obtained from the JPO website.*

(Continued)

Primary Examiner — Robert B Davis
(74) Attorney, Agent, or Firm — Honigman Miller Schwartz & Cohn LLP; Eric J. Sosenko; Jonathan P. O'Brien

(57) ABSTRACT

A device (31) for injecting an incompressible, pressurized liquid into a container (18) made of a thermoplastic material so as to shape the container (18), includes: a pipe (30) for supplying the liquid, which is to connect a liquid source (40) to the container (18); pumping elements (42) for causing the liquid to flow in the supply pipe (30) toward the container (18) at a first pressure (P1); and compression elements (44) for temporarily raising the pressure of the liquid contained in the container (18) to a second pressure (P2) that is greater than the first pressure (P1), wherein the compression elements (44) are formed by a work chamber (48), whose volume is variable, and which is connected only to the supply pipe (30) between the pumping elements (42) and the container (18).

9 Claims, 3 Drawing Sheets

(51) Int. Cl.
  *B65B 3/02* (2006.01)
  *B29C 49/06* (2006.01)

(56) References Cited

U.S. PATENT DOCUMENTS

| | | | |
|---|---|---|---|
| 5,622,735 A * | 4/1997 | Krishnakumar et al. | 425/530 |
| 7,914,726 B2 * | 3/2011 | Andison et al. | 264/524 |
| 2005/0206045 A1 | 9/2005 | Desanaux et al. | |
| 2011/0089614 A1 | 4/2011 | Hirdina | |
| 2011/0094186 A1 | 4/2011 | Chauvin et al. | |
| 2011/0135778 A1 | 6/2011 | Andison et al. | |

FOREIGN PATENT DOCUMENTS

| | | |
|---|---|---|
| FR | 1 055 883 A | 5/1951 |
| FR | 2 839 277 A1 | 11/2003 |
| JP | 11179793 A * | 7/1999 |
| WO | 03095179 A1 | 11/2003 |

OTHER PUBLICATIONS

International Search Report, dated Sep. 27, 2012, from corresponding PCT application.

* cited by examiner

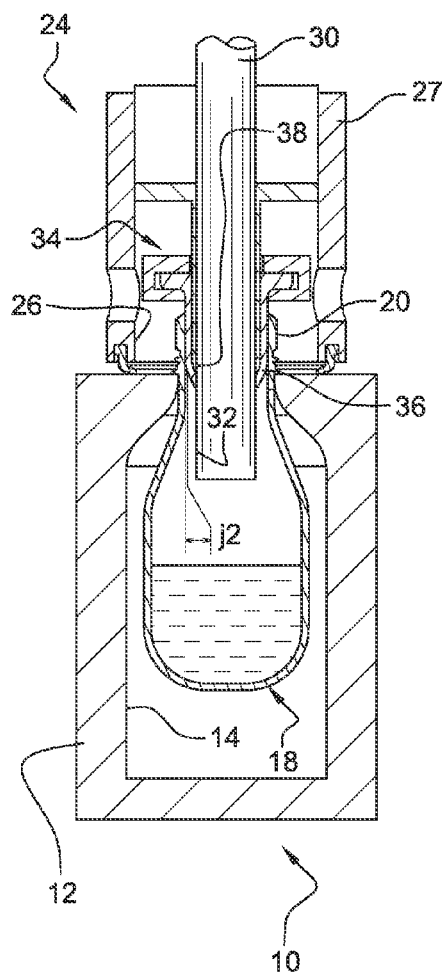 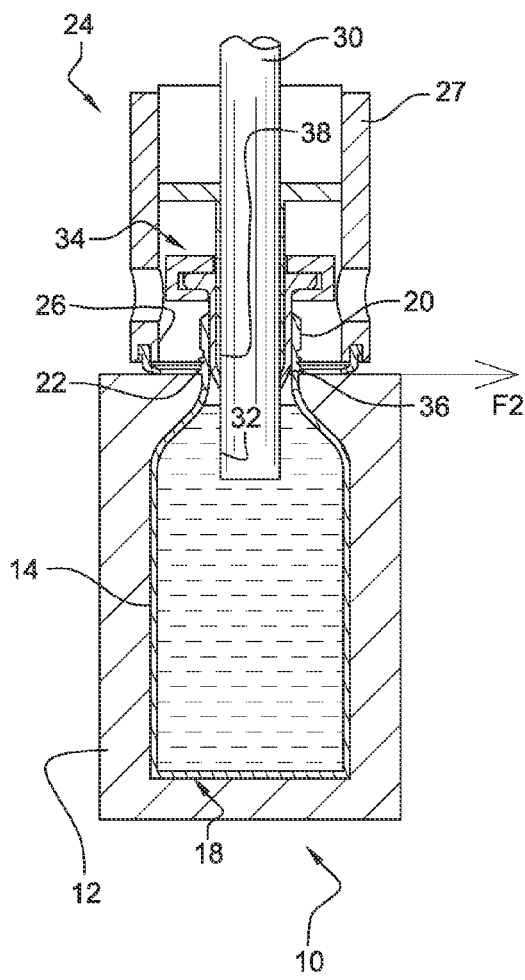
C-C
Fig. 3
B-B
Fig. 4

DEVICE FOR INJECTING A PRESSURIZED LIQUID IN ORDER TO SHAPE A CONTAINER, COMPRISING A WORK CHAMBER ARRANGED DOWNSTREAM FROM PUMPING MEANS

The invention relates to a device for injecting a pressurized liquid in order to shape containers of thermoplastic material.

The invention relates more particularly to a device for injecting an incompressible pressurized liquid into a container of thermoplastic material which is preheated in the parison state in order to shape the container in a final state by deforming, the injection device including:
- a liquid supply pipe which is intended to connect a liquid source to the container;
- pumping means in order to make the liquid circulate in the supply pipe toward the container at a first pressure;
- compression means in order to raise the pressure of the liquid contained in the container in a temporary manner up to a second pressure which is higher than the first pressure.

The production of containers in thermoplastic material such as bottles, vials, etc. is effected by shaping the containers in the parison state, which are sometimes called preforms.

Prior to implementing the shaping process, the containers in the parison state are heated in a thermal conditioning oven so as to give them a structure which is sufficiently malleable for the shaping process.

Said containers in the parison state are then introduced into a molding unit with which are generally associated blowing means or stretch-blowing means.

At the end of the shaping process, a filling stage is implemented. During said filling stage, the container in the final state is generally filled with a liquid which is intended to be commercialized or transported in the final container.

Document EP-A-2.143.544 has proposed modifying the shaping process by using a liquid in order to finalize the shaping of the container. The process according to said prior art thus includes a first stage of partial expansion of the container from its parison state to an intermediate state by blowing in a low-pressure blowing gas, then a second stage of filling the container in said intermediate state with a filling liquid, and finally, a third stage of shape adoption during which the liquid contained in the container is put under a high pressure so as to give the container its final shape.

The filling liquid is generally considered to be incompressible in relation to a gas. This therefore allows for an efficient, rapid increase in pressure.

In an advantageous manner, the liquid used during the third stage of shape adoption is the liquid which is intended to be transported in the container in the final state. Such a process thus allows the container to be filled with the liquid during the shaping process. This notably allows time to be saved by avoiding adding a filling operation after the shaping process.

Document WO-A1-03/095179 proposed injecting the liquid into the container by means of a cylinder which includes a work chamber in which a piston moves. The work chamber has a volume which is at least equal to the volume of the container to be filled. Thus, when the cylinder is actuated, the liquid is injected under pressure into the preform. To obtain a high pressure at the end of the filling, a stronger force is applied to the piston.

Said solution is technically satisfactory. Nevertheless, the cylinder used is very cumbersome.

The object of the present invention is to provide a device for injecting liquid which is more high-performance and less cumbersome.

To this end, the invention proposes an injection device of the type described in the introduction, characterized in that the compression means are formed by a cylinder which includes a work chamber with a variable volume which is connected solely to the supply pipe downstream of the pumping means.

According to other characteristics of the invention:
- the maximum volume of the work chamber is appreciably less than the total volume of the container in the final state;
- the work chamber includes one single liquid inlet and outlet opening, the single opening being connected to the supply pipe by way of a branch circuit;
- the work chamber is inserted into the supply pipe, the work chamber including:
  - a first inlet opening which is connected to a portion upstream of the supply pipe;
  - and a second output opening which is connected to a portion downstream of the supply pipe;
- an anti-reflux means is inserted into the supply pipe between the pumping means and the work chamber;
- the anti-reflux means is arranged close to the work chamber;
- the first inlet opening is capable of being plugged when the volume of the work chamber is reducing to its minimum volume;
- the pumping means force the liquid in the supply pipe to flow back at a pressure which is approximately constant;
- the pumping means are formed by a motorized pump which has a cubic capacity which is less than the total volume of the container in the final state;
- the work chamber is arranged close to the container.

Other characteristics and advantages will appear during the reading of the detailed description which will follow, for comprehension of which reference will be made to the accompanying drawings, among which:

FIG. 3 is a similar view to that of FIG. 1 in which the seal of the sealing mechanism is in a lowered insertion position and in a retracted state;

FIG. 4 is a similar view to that of FIG. 3 in which a seal is in an expanded state in order to close the container in a sealing manner;

For the rest of the description, elements presenting analogous, identical or similar functions will be designated by the same reference numbers.

FIG. 1 shows a molding unit 10 which is suited to implement a shaping process which includes:
- a first stage of blowing a first pressurized fluid, which, in this case, is a compressible blowing gas such as air, then a second stage of filling with a second low pressure fluid, which, in this case, is an incompressible filling liquid, such as water, which is intended to be packaged in the container;

Figures 1, 2:
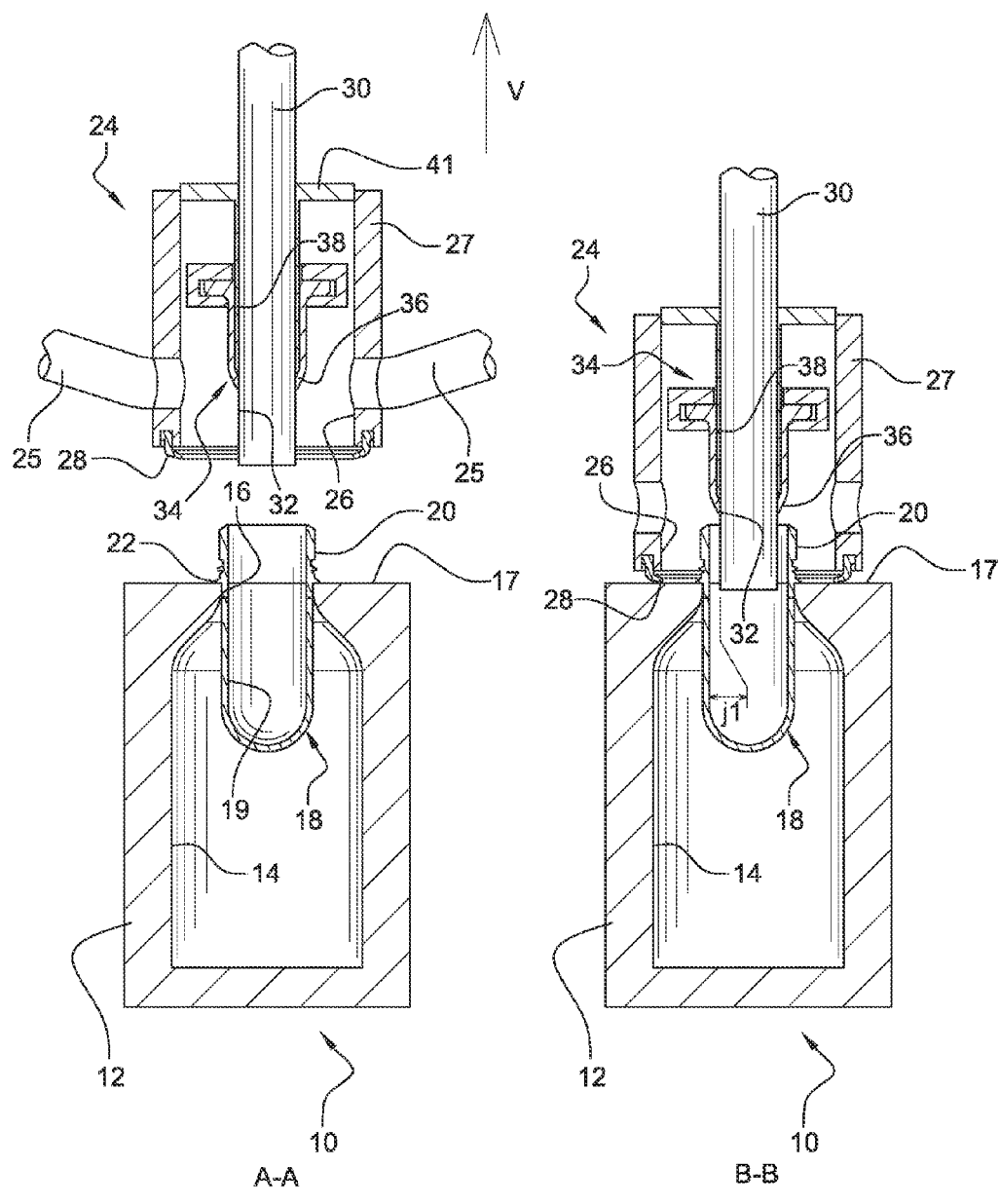
FIG. 1 is a view in axial section which shows an injector head of the injection device which is arranged in an upper standby position above the neck of a container which is arranged in a mold, the container being in the parison state.
FIG. 2 is a similar view to that of FIG. 1, in which the injector head occupies a lower injection position, the seal of the sealing mechanism is in an upper retracted position.

a final stage, so-called shape adoption, during which the liquid contained in the container is taken to a high pressure in order to make the walls of the container lean strongly against the inside surfaces of the mold cavity.

The molding unit 10 includes a mold 12 which is generally realized in several parts which can be separated in order to introduce and/or extract the container before and after its shaping.

The mold includes a cavity 14 which is open vertically upward by means of an upper opening 16 realized in a horizontal upper surface 17 of the mold 12.

The mold 12 is intended to accommodate a container 18 of thermoplastic material. Such a container 18 in the parison state is generally called a preform. The container 18 in the parison state is first of all thermally conditioned so as to make the thermoplastic material sufficiently malleable so that the container 18 can be inflated, or expanded, in order to form a final container which has the same shape as the cavity 14, as shown in FIG. 4.

The container 18 generally includes a hollow body 19 which is open upward by means of an opening delimited radially by a neck 20 with a vertical axis, also called a mouth. The body 19 and the neck 20 are separated by an external flange 22. Just the body 19 of the container 18 in the parison state is accommodated in the cavity 14 of the mold 12, the neck 20 extending outside the cavity 14 exiting through the upper opening 16.

The molding unit 10 includes a head 24 for injecting at least two pressurized fluids into the axially orientated neck 20 of a container 18 in order to shape a finished container by deforming said container 18 in the parison state by the successive injection of a first pressurized fluid, then a second pressurized fluid.

In the figures, the injection head 24 has overall symmetry of revolution compared with the vertical axis of the neck 20.

As explained beforehand, the first fluid is made up of a blowing gas such as compressed air at 10 bar, whilst the second fluid is made up of an incompressible liquid, such as water, capable of being compressed to a pressure of 40 bar.

The head 24 is capable of being driven between:
an upper standby position, such as shown in FIG. 1, in which it is arranged at a spacing above the upper surface 17 of the mold 12 so as to allow a container 18 in the parison state to be introduced or a final container to be extracted; and
a lower injection position, such as shown in FIGS. 2 to 4, in which the head 24 is capable of injecting the pressurized blowing gas and/or the pressurized filling liquid.

The head 24 includes at least one first pneumatic pipe 25 which is connected to a driven compressed air source (not shown). The first pneumatic pipe 25 opens out into a bell 26 which is capable of covering the neck 20 in a sealing manner when the head 24 is in its lower injection position.

The lower end edge of the bell 26 is provided with a seal 28 which is intended to be tightened vertically downward against the upper surface 17 of the mold 12 or against the flange 22 of the neck 20.

The head 24 includes, moreover, a second supply pipe 30 which is connected to a driven device 31 for injecting pressurized filling liquid. The part of the second supply pipe 30 which is formed in the housing 27 has a vertical "A" axial orientation. The lower end of the second supply pipe 30 opens out into an injector nozzle 32 with a vertical axis coaxial to the axis "A" of the neck 20 of the container 18. The nozzle 32 has a smaller diameter than the inside diameter of the neck 20 such that when the nozzle 32 is inserted into the neck 20, there is an annular clearance "j1" between the neck 20 and the nozzle 32.

The injector head 24 also includes a driven sealing mechanism 34 which is capable of being driven between an open position in which the blowing gas is capable of passing through the first radial annular clearance "j1" in order to penetrate or exit from the container 18, and a closed position in which a seal 36 plugs the first radial clearance "j1" between the nozzle 32 and the neck 20 of the container 18 in a sealing manner.

Said driven sealing mechanism 34 is notably used in order to allow the pressure of the filling liquid contained in the container 18 to be raised to a high pressure, such as 40 bar, without making said filling liquid seep toward the bell 26 through the first radial clearance "j1". This notably allows hygiene constraints to be respected by preventing the filling liquid from being contaminated by contact with the outside of the neck 20, the housing 27 and/or the mold 12.

The annular seal 36 is arranged on the outside around the nozzle 32. The seal 36 is elastically deformable between a retracted state, such as shown in FIGS. 2 and 3, corresponding to the open position of the sealing mechanism 34, and an expanded state, such as shown in FIG. 4, in which the annular seal 36 is firmly pressed by a piston 38 radially against the inside wall of the neck 20 of the container 19 in order to plug the first radial clearance "j1" in a sealing manner, and which corresponds to the closed position of the sealing mechanism 34.

The structure and the operation of such a sealing mechanism are described in more detail in French Patent Application No. 10 55883.

The device 31 for injecting liquid is now described in detail.

The filling liquid is a liquid which is considered to be incompressible, such as water.

The device 31 for injecting the incompressible liquid includes the liquid supply pipe 30 which connects a liquid source 4 to the interior of the container 18.

Pumping means 42 are inserted into the liquid supply pipe 30. The pumping means 42 allow the liquid to be circulated in the supply pipe from upstream to downstream in the direction of the container 18.

The pumping means 42 suck in the incompressible liquid from the source 40 and they force the liquid in the supply pipe 30 to flow back in the direction of the container 19 at a first approximately constant pressure. The first pressure "P1", the so-called "low pressure P1", is, for example, between 5 and 20 bar inclusive.

FIG. 3 shows the container 18 during filling with the low pressure liquid passing through the nozzle 32.

The pumping means 42 are formed by a motorized pump which has a cubic capacity which is less than the total volume of the container 18 in the final state. In this way, the pumping means 42 have a reduced size. This allows a very compact injection device 31 to be obtained. It is, for example, a piston pump or a rotary vane pump.

Furthermore, the injection device 31 also includes compression means 44 in order to raise the pressure of the liquid contained in the container 18 in a temporary manner to a second pressure "P2" which is higher than the first pressure "P1". The second pressure will be designated hereafter as "high pressure P2". The liquid is put under high pressure "P2" in the container 18 when the seal 36 is in its expanded state.

This allows the wall of the container 18 to be compressed against the surfaces of the cavity 14 in order to give the container 18 its final shape.

The compression means 44 are formed by distinct elements of the pumping means 42.

The compression means 44 are provided with a cylinder 46 which includes a work chamber 48 with a volume that is variable between a maximum volume and a minimum volume. The work chamber 48 is connected solely to the supply pipe 30.

The work chamber 48 is connected to the supply pipe 30 downstream of the pumping means 42 and upstream of the container 18.

In this case, the cylinder 46 is formed by a piston cylinder. The work chamber 48 is thus delimited radially and vertically downward by a cylinder. It is delimited vertically upward by a piston 50 which is mounted so as to slide in the cylinder so as to vary the volume of the work chamber 48.

As a variant, it will be understood that the cylinder can be of another type known to the expert, such as a flexible cylinder or a rotary piston cylinder.

The maximum volume of the work chamber 48 is appreciably less than the total volume of the final container 18. In effect, the liquid is intended to be compressed at a high pressure "P2" solely during the last stage of shaping, illustrated in FIG. 4.

When said stage is engaged, the container 18 has a volume very close to its final volume. Furthermore, the container 18 and the supply pipe 30 are already filled with liquid at low pressure "P1". Thus, when the pressure of the liquid is raised in order to reach the high pressure "P2" by activating the piston 50, the volume of the container 18 increases very weakly with regard to its final volume, for example between 1% and 10%. For example, for a final container with a capacity of 1 L, the volume of water that the cylinder 46 has to inject into the container 18 will be between 1 cL and 10 cL inclusive. The cylinder 46 thus has a much reduced size.

An anti-reflux means 52 is inserted into the supply pipe 30 upstream of the work chamber and downstream of the pumping means 42. Said anti-reflux means 52 prevents the liquid at high pressure "P2" from being forced to flow back toward the pumping means 42 and toward the source 40.

The anti-reflux means 52, in this case, is formed by a non-return valve. However, it will be understood that any other means known to the expert to prevent the high pressure liquid from being forced to flow back toward the source can be used.

In an advantageous manner, the anti-reflux means 52 is arranged close to the work chamber 48. This allows the portion of the supply pipe 30 which is arranged upstream of the work chamber 48 to be prevented from being subject to the high pressure "P2". The supply pipe 30 would in effect risk becoming deformed. This would cause, on the one hand, a risk of the supply pipe 30 rupturing and, on the other hand, a needless increase in the volume of the cylinder 46.

For the same reasons, the work chamber 48 is arranged close to the container 18, that is to say close to the mold 12, so as to reduce the length of the portion of the supply pipe 30 which connects the work chamber 48 to the container 18.

Figure 5:
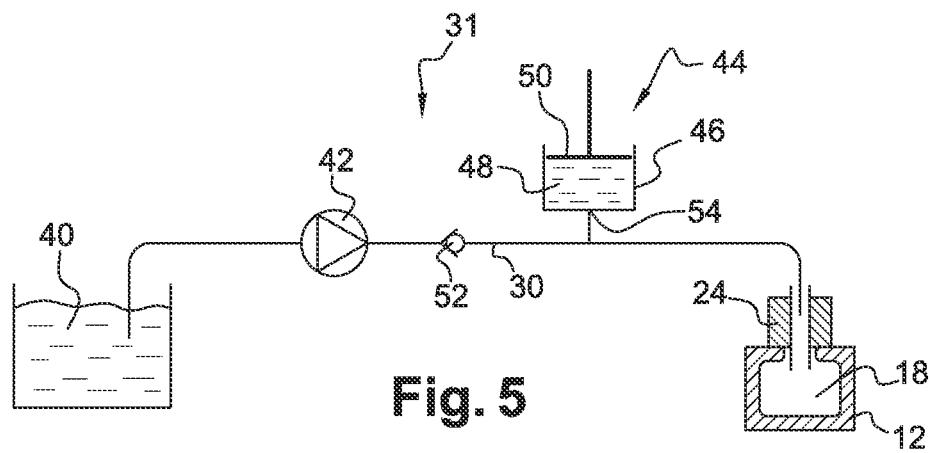
FIG. 5 is a schematic view which shows a device for injecting pressurized liquid realized according to a first embodiment of the invention.
Figure 6:
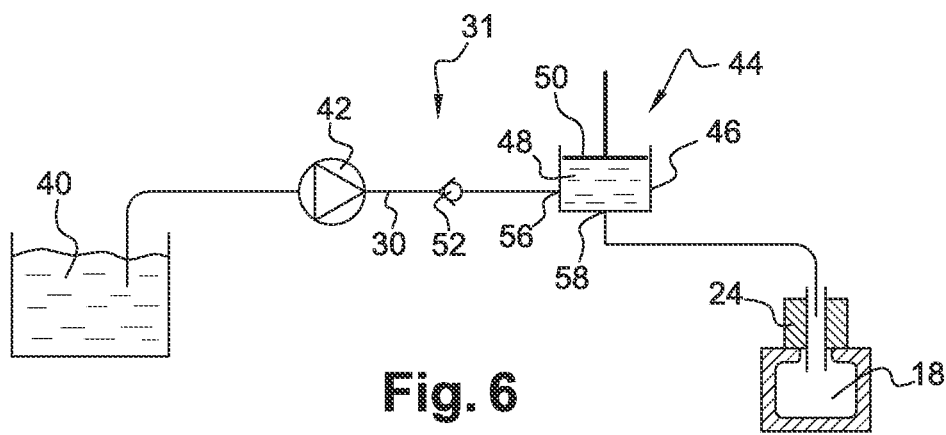
FIG. 6 is a schematic view which shows a device for injecting pressurized liquid realized according to a second embodiment of the invention.

In the first embodiment of the invention which is shown in FIG. 5, the work chamber 48 includes one single inlet and outlet opening 54 for the liquid. The single opening 54 is connected to the supply pipe 30 by way of a bypass. Thus, the liquid forced to flow back by the pumping means 42 does not circulate through the work chamber 48 before reaching the container 18. The single opening 54 is advantageously arranged facing the piston 50. In a second embodiment of the invention which is shown in FIG. 6, the work chamber 48 is inserted into the supply pipe 30. The work chamber 48 therefore includes a first inlet opening 56 which is connected to a portion upstream of the supply pipe 30, and a second outlet opening 58 which is connected to a portion downstream of the supply pipe 30. Thus, the liquid forced to flow back by the pumping means 42 circulates through the work chamber 48 before reaching the container 18.

The outlet opening 58 is arranged facing the piston 50 whilst the inlet opening is arranged in the cylindrical wall of the work chamber 48.

Figure 7:
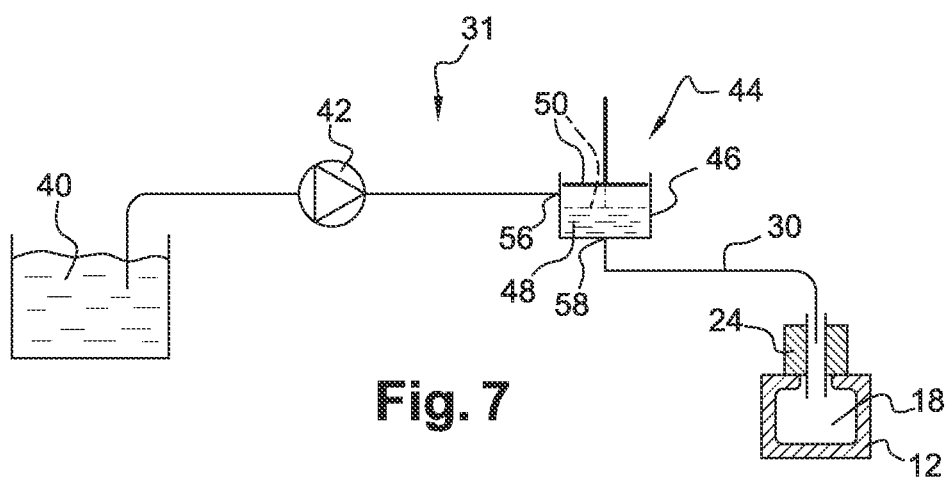
FIG. 7 is a schematic view which shows a device for injecting pressurized liquid realized according to a third embodiment of the invention.

A third embodiment is shown in FIG. 7. Said third embodiment is very similar to the second embodiment of the invention. Just the differences between said two embodiments will be described below.

In said embodiment, the inlet opening 56 is arranged so as to open out into the work chamber 48 when the piston 50 is in a position corresponding to the maximum volume of the chamber 48, and so as to be plugged by a wall of the piston 50 when this latter slides up to a position which corresponds to the minimum volume of the chamber 48.

Thus, said wall of the piston forms the anti-reflux means 52. It is no longer necessary to arrange a non-return valve upstream of the work chamber 48 as the piston 50 prevents the liquid returning toward the source 40 when it slides.

During the operation of the device as claimed in any one of the embodiments, liquid is sucked into the work chamber 48 when the piston slides in the direction of its position which corresponds to the maximum volume of the work chamber 48. In an advantageous manner, said suction operation is realized during the first stage of the shaping process so as not to disturb the flow of liquid toward the container 18 during the second shaping stage.

The injection device described beforehand is also applicable to a device for molding solely by the injection of liquid. In this case, the molding device does not include means for injecting a blowing gas. The operation of filling the work chamber 48 is therefore realized during the pause between discharging the container in the final state and loading a new container in the parison state.

The invention allows a small size injection device 31 to be obtained in order to realize a rise in the pressure of the liquid in the container up to the high pressure "P2".

The invention claimed is:

1. A device for injecting an incompressible pressurized liquid into a container of thermoplastic material which is preheated in the parison state in order to shape the container in a final state by deforming, the device comprising:
    a liquid supply pipe which is intended to connect a liquid source to the container;
    pumping means in order to make the liquid circulate in the supply pipe toward the container at a first pressure (P1);
    compression means in order to raise the pressure of the liquid contained in the container in a temporary manner up to a second pressure (P2) which is higher than the first pressure (P1); and
    the compression means formed by a work chamber with a variable volume which is connected solely to the supply pipe downstream of the pumping means, the work chamber having a maximum volume that is appreciably less than the total volume of the container in the final state.

2. The device as claimed in claim 1, wherein the work chamber includes one single liquid inlet and outlet opening, the single opening being connected to the supply pipe by way of a branch circuit.

3. The device as claimed in claim 1, wherein the work chamber is inserted into the supply pipe, the work chamber including:
- a first inlet opening which is connected to a portion upstream of the supply pipe; and
- a second output opening which is connected to a portion downstream of the supply pipe.

4. The device as claimed in claim 1, wherein an anti-reflux means is inserted into the supply pipe between the pumping means and the work chamber.

5. The device as claimed in claim 4, wherein the anti-reflux means is arranged close to the work chamber.

6. The device as claimed in claim 3, wherein the first inlet opening is capable of being plugged when the volume of the work chamber is reducing to its minimum volume.

7. The device as claimed in claim 1, wherein the pumping means forces liquid in the supply pipe to flow back at a pressure (P1) which is approximately constant.

8. The device as claimed in claim 1, wherein the pumping means is formed by a motorized pump which has a cubic capacity which is less than the total volume of the container in the final state.

9. The device as claimed in claim 1, wherein the work chamber is arranged close to the container.

* * * * *